United States Patent [19]
Dodson

[11] Patent Number: 5,025,161
[45] Date of Patent: Jun. 18, 1991

[54] DETECTING MULTIPLE PHASES IN LIQUID SCINTILLATION SAMPLES

[75] Inventor: Charles L. Dodson, Orange, Calif.

[73] Assignee: Beckman Instruments, Inc., Fullerton, Calif.

[21] Appl. No.: 386,303

[22] Filed: Jul. 27, 1989

[51] Int. Cl.[5] .............................................. G01T 1/204
[52] U.S. Cl. .................................... 250/364; 250/328; 250/362
[58] Field of Search ........................ 250/362, 364, 328

[56] References Cited

U.S. PATENT DOCUMENTS

| | | | |
|---|---|---|---|
| 3,725,657 | 7/1971 | Laney | 250/362 |
| 4,075,480 | 2/1978 | Horrocks | 250/328 |
| 4,085,325 | 4/1978 | Atallah et al. | 250/328 |
| 4,292,520 | 9/1981 | Jordan | 250/328 |
| 4,315,151 | 2/1982 | Horrocks | 250/362 |
| 4,555,629 | 11/1985 | Everett | 250/362 |
| 4,633,088 | 12/1986 | Jones et al. | 250/369 |
| 4,700,072 | 10/1987 | Oikari et al. | 250/328 |
| 4,894,545 | 1/1990 | Dodson | 250/364 |

FOREIGN PATENT DOCUMENTS 220146 3/1985 German Democratic Rep. .

OTHER PUBLICATIONS

Ross, et al., "Quantitative Interpretation of Color Quenching in Liquid Scintillator Systems," *J. Analytical Chemistry* 35, 7 (Jun. 1963), pp. 794–797.
Ediss, et al., "A Broad Spectrum Color Quencher for Liquid Scintillation Counting," *Int. J. Appl. Rad. Isot.*, vol. 33 (1982), pp. 296–297.
Ross, H. H., "Theoretical and Experimental Aspects of Quenching Variables from Biomedical Samples in Liquid Scintillator Systems," *Symposium on Radioisotope Sample Measurement Techniques in Medicine and Biology*, VIENNA IAEA, pp. 447–455 (1965).
Bush, E. T., "A Double Ratio Technique as an Aid to Selection of Sample Preparation Procedures in Liquid Scintillation Counting," *Int. J. Appl. Rad. Isot.* 19 (1968), pp. 447–452.
Ross, H. H., "Color Quench Correction in Liquid Scintillator Systems Using an Isolated Internal Standard," *J. Analytical Chemistry* 37, 4 (Apr. 1965), pp. 621–623.
Iwakura, T. et al., "Carbon-14 and Hydrogen-3 Measurement by Means of a Liquid Scintillation Spectrometer: Color Quenching," *Symposium on Radioisotope Sample Measurement Techniques in Medicine and Biology* (1965), pp. 447–455.

Primary Examiner—Constantine Hannaher
Attorney, Agent, or Firm—Charles Berman

[57] ABSTRACT

Determining whether a liquid scintillation sample is single- or multi-phase includes transforming all or a portion of a Compton Spectrum of data into different namely integrated, geometric space. A predetermined parameter in the selected geometric space, indicative of the phase content of the sample is selected, and compared with the data in the different geometric space. This provides a determination of the phase content of the sample. The linearity of the data indicates the phase content.

29 Claims, 6 Drawing Sheets

DETECTING MULTIPLE PHASES IN LIQUID SCINTILLATION SAMPLES

RELATED APPLICATION

This application is related to an application Ser. No. 07/386,816 entitled "Color Monitoring in Liquid Scintillation Systems" by the present Applicant and filed simultaneously with this application reference herein.

BACKGROUND

This invention relates to liquid scintillation detectors. In particular, it relates to the detection of multiple phases in liquid scintillation samples. The invention is concerned with a method for such detection and apparatus employing the method to detect the presence of multiple phases in a liquid scintillation sample.

A sample prepared for liquid scintillation counting includes a radionuclide sample matrix placed in a liquid scintillation cocktail. An electron is emitted directly from the radionuclide or is produced indirectly by the radionuclide. The electron interacts with molecules in the cocktail by mechanisms which produce one or more photons per electron event. The intensity of the light, or equivalently the number of photons produced, is proportional to the kinetic energy of the electron.

In an idealized measurement there are no interferences. Thus, for each emitted electron, one light burst or event occurs. In such a case, a count of the number of light events is a count of the number of electrons produced. This, in turn, provides a count of the number of radionuclides present, and that is the ideal purpose. A count of the actual number of electron producing nuclides is the number of disintegrations occurring. If counted for one minute, it is the disintegrations per minute (DPM).

For a variety of reasons, the real measurement produces fewer counts per minute (CPM) than actually occur. In other words, the efficiency of the process, E, is less than 100% and is given by the equation $$E = \frac{100 CPM}{DPM}$$

where CPM is the observation provided from the actual DPM occurring. Common knowledge within this field provides means to obtain the efficiency E. As the measurement procedure itself provides CPM, the above equation gives DPM.

In practice, it frequently happens that a liquid scintillation sample separates into two or more phases, for example an organic phase and an aqueous phase. Consequently, the molecules containing the radionuclide are distributed between the aqueous and organic phases. These two phases do not, in general, exhibit the same counting efficiency. Phase 1 has efficiency $E_1$ and produces $CPM_1$ countable events. Phase 2 has efficiency $E_2$ and produces $CPM_2$ countable events. This means that the number of disintegrations, DPM, is given by:

$$DPM = \frac{100 CPM_1}{E_1} + \frac{100 CPM_2}{E_2}$$

The system, however, does not provide $CPM_1$ and $CPM_2$, but the total CPM. Neither are $E_1$ and $E_2$ known in general. Therefore, DPM cannot be obtained. Thus, samples containing two or more phases can not provide information about DPM.

Multi-phase samples, namely samples having two or more phases should ideally be eliminated from the measurement system. Such multi-phase or multiple phase samples in a clear pyrex vial can usually be observed by the operator and therefore can often be removed from a sample set associated with a measurement procedure. Observation through plastic vials however, varies from difficult to impossible. Also a multi-phase condition may occur belatedly, namely after several hours. Such a condition can occur hours after being placed in a liquid scintillation counter and result in inaccuracy. For these reasons, at least, there is a need to provide a detection method and apparatus to detect multiple-phase samples.

A previous technique is that of using a graphical plot between two different quench monitors using standard one phase samples. E. T. Bush, Int. J. Appl. Rad. Isot. 19, 447 (1968), "A Double Ratio Technique as an Aid to Selection of Sample Preparation Procedures in Liquid Scintillation Counting." One of the quench monitors measures the external standard channels ratio ("ESCR") which is independent of radionuclide and characterizes cocktail quenching. The second monitor is a sample channels ratio ("SCR") which depends upon the sample spectrum and characterizes sample counting efficiency. An unknown sample with two or more phases would deviate from the plot for the one phase sample and thereby be identified. With only a single phase present in the unknown sample, then the cocktail efficiency and sample efficiency would follow the dependency of the graphical plot of the one phase ESCR against SCR. If all of the sample is either not in solution or alternatively there is multiple-phase, then the SCR value of the unknown sample will not follow the ESCR value of the plot.

A variation of this graphical plot technique is disclosed by Everett (U.S. Pat. No. 4,555,629). This procedure plots the end point of the sample spectrum rather than SCR, against the mean point of the external standard spectrum, rather than the ESCR. Multi-phase samples deviate from this graphical plot and are thereby detected.

A third approach is disclosed by Horrocks (U.S. Pat. No. 4,315,151). This approach depends upon irradiation of the sample by an external standard, for example Cs-137, to produce a Compton spectrum. A single phase sample produces one Compton spectrum; a two phase sample, two Compton spectra, etc. This multi-phase monitor consisted of plotting the inflection point of the least quenched phase, its H# (Horrocks, U.S. Pat. No. 4,075,480), against the mean of the entire Compton spectrum. Significant deviations on unknowns from this plot indicate the presence of multi-phase samples.

Difficulties exist with these prior art techniques. Should a sample spectrum be used, then the count time must increase as sample activity decreases. Accordingly, sample throughput is affected and the effective quench range is small. The Bush and Everett techniques have these disadvantages. The Horrocks system is limited where plastic vials are used in that the effective quench range is small. Also, the inflection point of the least quenched phase is needed, and this depends upon the vial composition, sample volume and the volume of each phase. Moreover, samples which contain color can be incorrectly characterized as multi-phase by the above procedures.

There is accordingly a need for the speedy detection of samples with two or more phases over a large quench range. In particular the time period should be no longer than that required to obtain an external standard quench value. There is also a need for this detection to be independent of vial composition and volume, cocktail type, and the sample or phase volume over a range, for instance, between 0.5 and 20 ml.

SUMMARY OF THE INVENTION

The invention seeks to meet the objectives in providing method and means for detecting multi-phase which includes two phase samples.

According to the invention, determining the phase content of a liquid scintillation sample comprises means for transforming the Compton spectrum automatically into a different geometric space. A predetermined parameter in the selected geometric space is established, indicative of the phase content of the sample. Data in the different geometric space are compared to the predetermined parameter to provide a determination of the phase content of the sample.

Preferably the different geometric space transforms the data into integrated Compton data. The predetermined parameter is the degree of linearity in the integrated space.

Use is made of the Compton spectrum of a sample generated by a nuclide, such as Cesium-137. A predetermined number of Compton edges exist according to the number of phases present in the sample.

An integrated Compton spectrum of a single phase sample with no quench is linear over a large portion of the spectrum, approximately 75%. As quench increases, the spectrum remains linear, but over a decreasing portion of the total spectrum. With two or more phases in the sample, the integrated Compton spectrum departs from linearity over the appropriately defined energy range. Equivalently, two linear segments with different slopes corresponding to two Compton edges overlap to produce non-linearity over the defined energy range.

The one-phase linearity and multi-phase non-linearity detection are independent of sample and vial composition. The dynamic quench range is about 15:1, which is larger than previous techniques, and the technique is independent of volume over a range of between 0.5 and 20 ml.

Linearity between the lower, $E_l$ and upper, $E_u$, energy points of the total energy spectrum is indicative of a single phase sample. Confirmation of the single phase condition occurs by testing at a second predetermined range on the spectrum. This test is conducted between about the 90% and the 99.5% point of the energy spectrum. The extent of the linearity between these further energy points confirm the phase content.

The invention is further described with reference to the accompanying drawings which are practical representations of various Compton spectra.

DRAWINGS

DESCRIPTION

The procedure for detecting multi-phases in a liquid scintillation sample proceeds by a determination of the Compton spectrum of the sample. In particular, a determination of the linearity of the integrated Compton spectrum is made.

Figure 1:
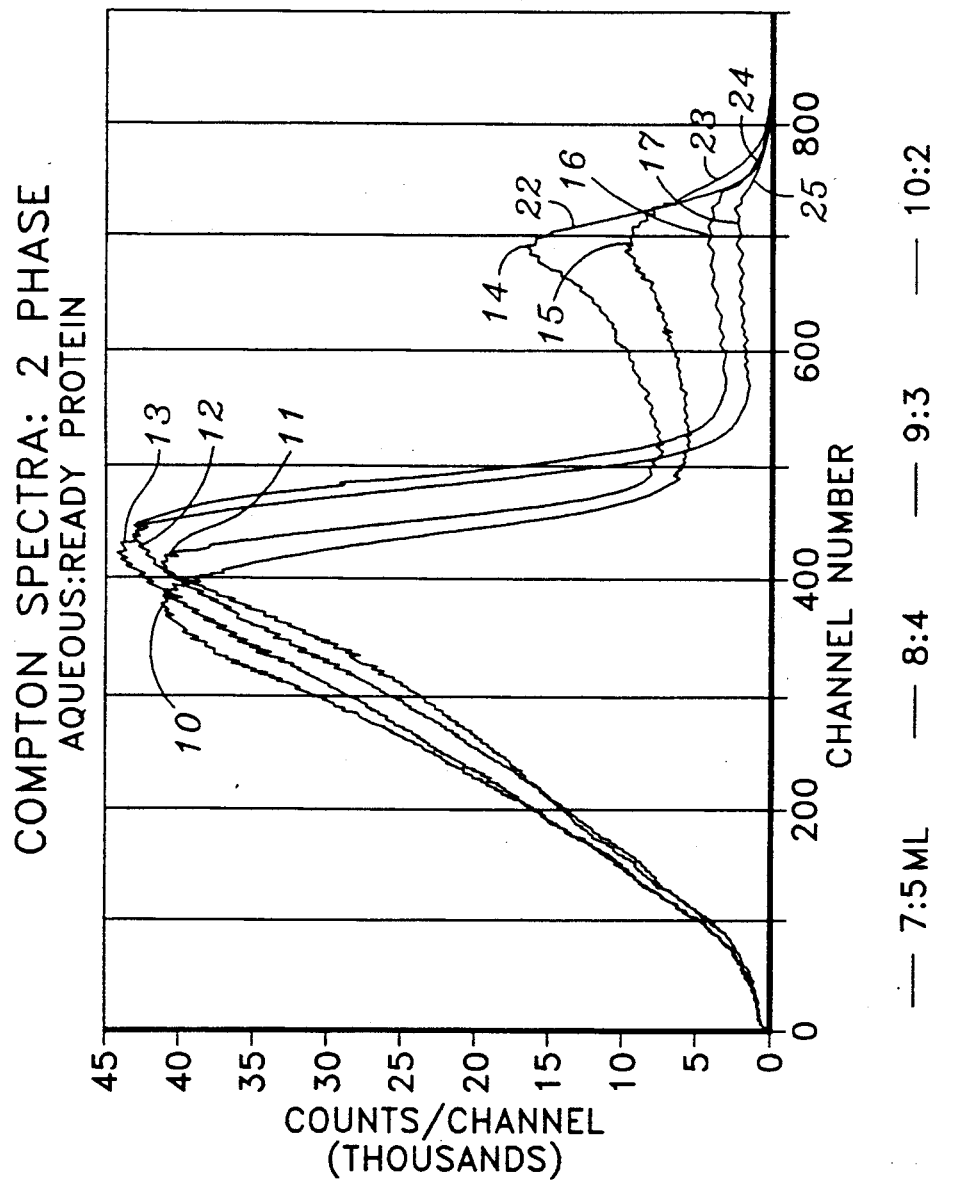
FIG. 1 is a Compton spectrum namely a plot of counts/channel against channel number of a two-phase sample. Four different spectra generated by Cesium-137 are illustrated on a log scale.

In FIG. 1 the Compton spectrum of a two-phase sample is illustrated on a log scale for four different samples. The illustration reflects a two-phase system and the group of peaks 10, 11, 12 and 13 represent the energy distribution of the first phase. The height of the peaks 10, 11, 12 and 13 respectively, is an indication of the volume of the first phase in the four samples. The group of peaks 14, 15, 16 and 17 are a second group representative of the second phase of the sample. Relative heights of these second peaks 14, 15, 16 and 17 is indicative of the volume of the second phase. The higher the peaks, the more of the second volume is present in the sample.

The further removed along the x axis the first group of peaks 10, 11, 12 and 13 are from the second group of peaks 14, 15, 16, and 17, the more difficult it is to determine whether the sample is a single phase or multi-phase. The closer the peaks are to the same height or closer together in energy distribution, the less difficulty there is in determining whether the sample is single or multi-phase.

Figure 2:
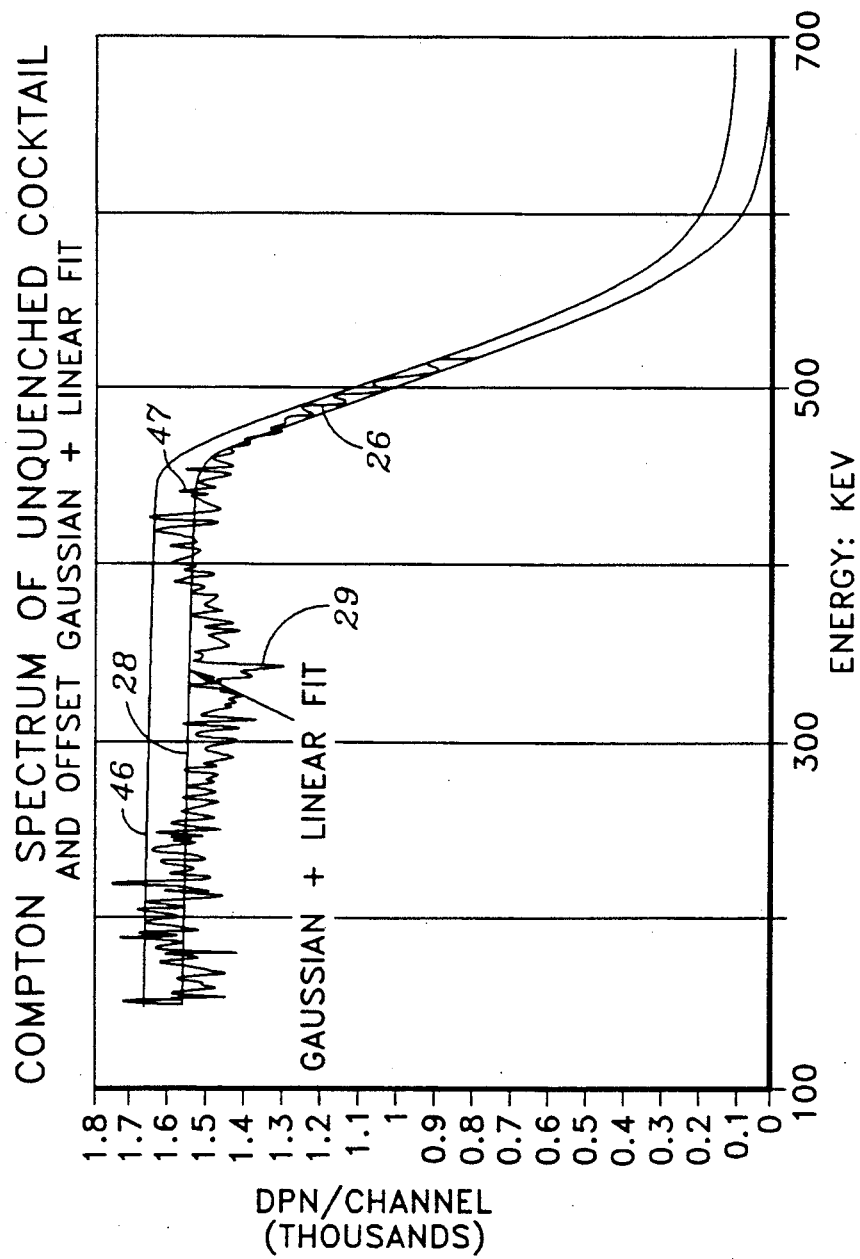
FIG. 2 is a Compton spectrum of unquenched one phase cocktail illustrating a plot of DPM per channel against the energy level on a linear scale, together with an offset Gaussian and linear fit plot for actual data.

A linear scale representation of a Compton spectrum of a unquenched cocktail is depicted in FIG. 2. It illustrates a half side of a Gaussian distribution 26 to the peak of the Gaussian 27 and thereafter a linear distribution fit 28 towards the lower energy level. The linear distribution 28 is a linear representation of the actual sample distribution 29.

Figure 3:
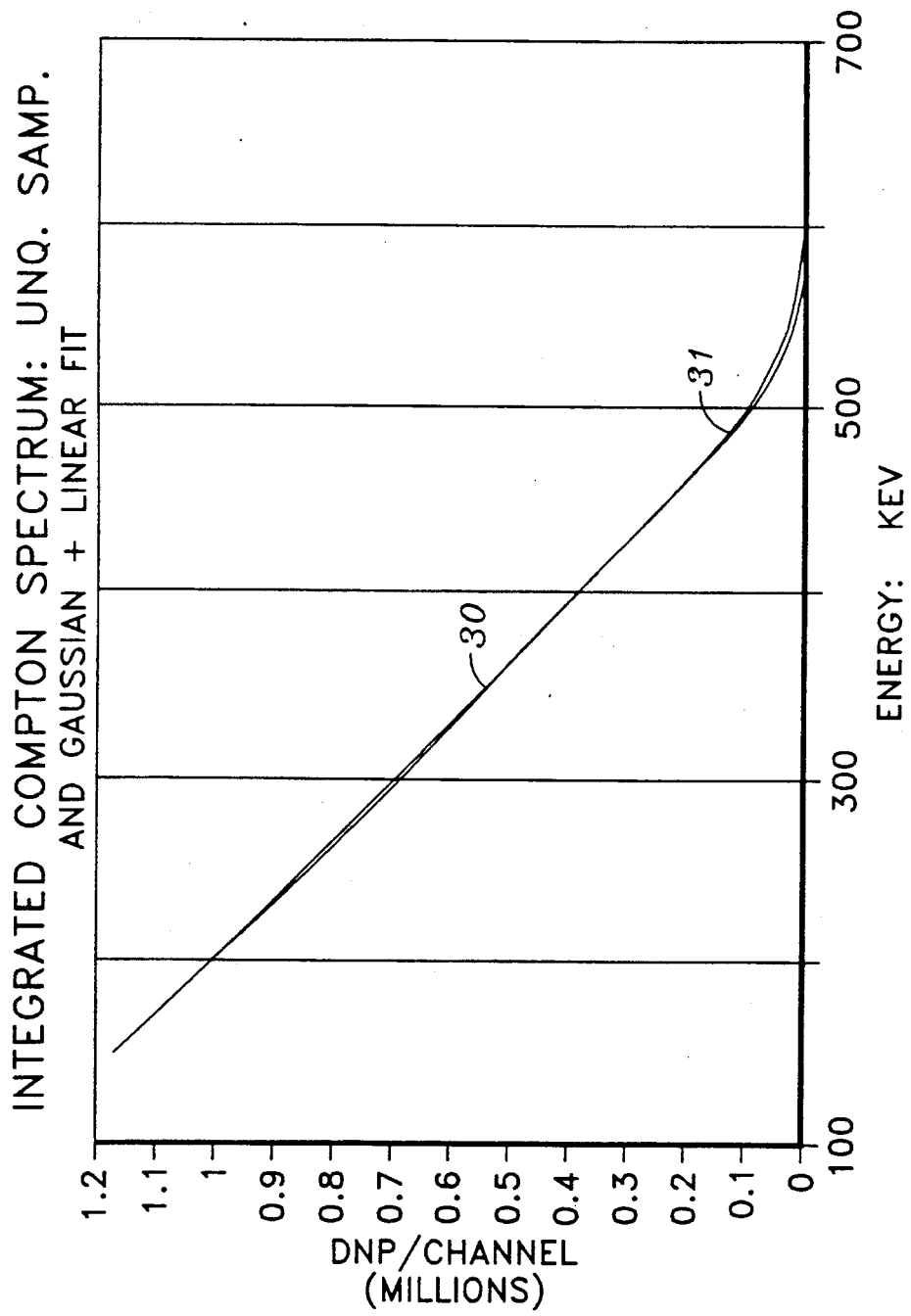
FIG. 3 is an integrated Compton spectrum of an unquenched sample of FIG. 2.

The integrated spectrum of the single phase unquenched sample in FIG. 2 is illustrated in FIG. 3. It is represented as a linear distribution 30. The equivalent point to the point of inflection 26 of FIG. 2 is represented in FIG. 3 at approximately point 31. At this stage of the sample phase determination, however, it is not precisely known exactly where point 31 falls on the linear integrated Compton spectrum of FIG. 3.

Figure 4:
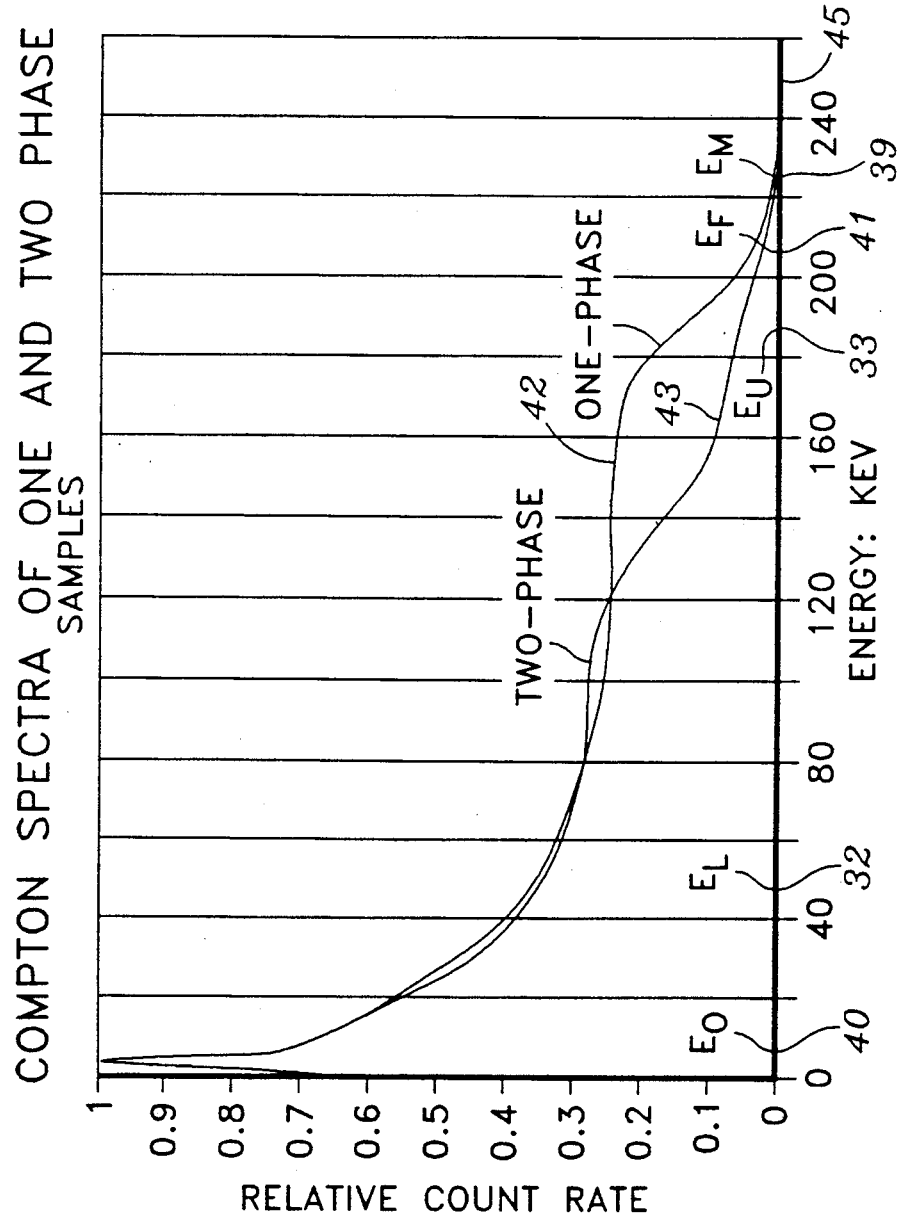
FIG. 4 shows a Compton spectra of one and two phase samples plotting the relative count rate against the energy on a linear energy scale.

FIG. 4 compares Compton spectra for one phase and two phase samples on a linear energy scale. The primary difference between the two spectra occurs at high energy. There is one Compton edge for the single phase sample and two edges for the two phase sample as noted previously.

Figure 5:
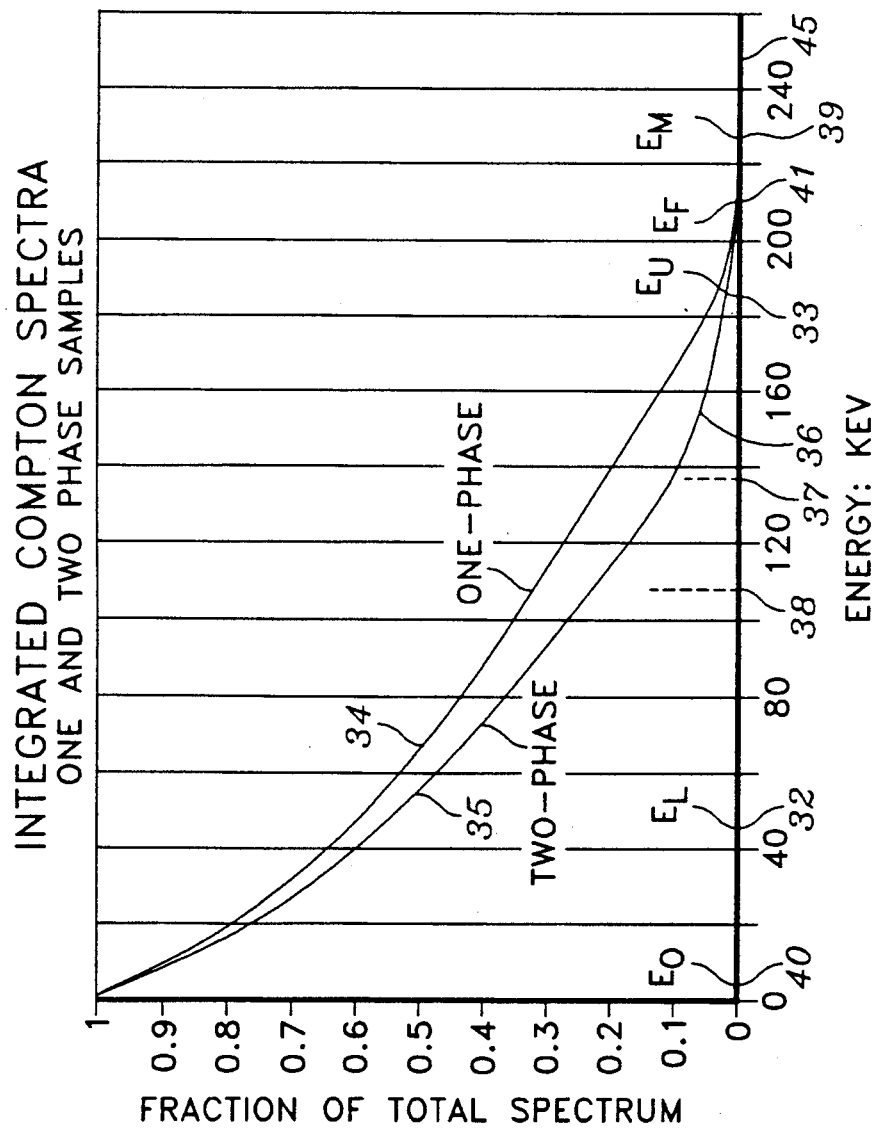
FIG. 5 shows a one and two phase samples integrated spectra illustrating the fraction of the total spectrum against the energy of the samples of FIG. 4.

The integrated forms of these spectra are provided in FIG. 5. Between point 32 and 33 the one phase sample is linear while the two phase sample is not. The two phase sample presents two linear segments, one bounded by 32 to 37 and the second by 36 to 41. This is an essential distinction presented by the integrated Compton spectra of the two samples.

If the analogs of FIG. 4 are examined for all possible types of sample, then it would be clear that all one phase samples generally present as shown in the figure. Variations include the actual position and length of the linear segment of the plot, both largely determined by the level of quench present.

Two phase samples are more complex. The relative locations, lengths and heights are determined by the volumes of each phase and the level of quench in each phase. Reference to FIG. 1 clarifies this for four samples with variable volumes in the two phases.

Consequently, the overall principles of the analysis are to determine generally the location of the upper and lower energy bounds, 32 and 33, respectively, for one phase samples as a function of volume, quench level, container size and composition, etc. Then, for a given sample with measured H#, the segment 32 to 33 is tested for linearity by any one of a variety of possible approaches. Should the linearity test be true within some predetermined limits, then the sample is homogeneous. Should the linearity test be false, then the sample has more than one phase, possibly two or more phases.

The relationship between the linear segment, points 32 to 33, and the quench level of the sample is predetermined and incorporated in the system. FIG. 4 shows that the linear segment spans approximately 5 to 55% of the total spectrum in this example. These percentages do vary but are available at other levels of quench.

Linearity may be evaluated by any of a variety of criteria: correlation coefficient, R, coefficient of determination, $R^2$, standard error, etc. Whatever the choice, e.g., $R^2$, the curve fit is determined as linear if $R^2$ exceeds some predetermined value so that a single phase is present. Should $R^2$ be less than the predetermined value, then the curve fit is non-linear. More than one phase is present, the sample is flagged and the analysis ends.

The determination of the phase content of the sample proceeds one step further, however, should the first test conclude that the segment 32 to 33 is linear. A second test is required because it is possible that the quench levels of the two phases are sufficiently different that segment 32 to 33 is not influenced by segment 36 to 41. Therefore, the second test is performed between energy points 39 to 41 of the integrated spectrum. As in the primary test, these points are variable with quench level and are determined for each sample presented to the LS counter. As one example, the points in FIG. 5 are located at approximately 90 to 99.5% of the total spectrum. A linear curve-fit analysis is applied as before to the segment 39 to 41 with linearity measured as before. Should segment 39 to 41 be non-linear, then a one phase system is confirmed. Should segment 39 to 41 be linear, then the sample possesses two or more phases.

Because the linearity checks cover a broad portion of the spectrum as opposed to the determination of single points, a higher degree of accuracy is obtained about the phase characteristics of the sample. With the linearity checks of the invention, the phase determination of the sample is independent of vial composition and size, cocktail type and sample and phase volumes over a range of about 0.5 to 20 ml.

EXAMPLES

Measurements are based on the fact that a Compton spectrum can be characterized by a Gaussian distribution plus a straight line distribution. FIG. 2 shows this distribution for an unquenched sample. The offset spectrum line 46 is provided for visibility of the shape. The integrated Gaussian-straight line spectrum in FIG. 3 superimposes the experimentally obtained Compton spectrum. The integrated spectrum in FIG. 3 is linear over a substantial portion of the total spectrum for a single phase sample. Finally, the integrated Compton spectrum is not linear over the designated portion for multi-phase samples as shown by FIG. 5.

EXEMPLARY DEFINITIONS

Em = energy corresponding approximately to the end point of Compton spectrum, namely point 39.

Eo = energy threshold above which the Compton spectrum is analyzed for the multi-phase condition, namely point 40.

El = lower energy bound for the primary, P test, namely point 32.

Eu = upper energy bound for the P test, namely point 33.

Ef = lower energy bound for the secondary, S test, namely, point 41.

Two tests, P and S, are performed to determine the presence of multi-phases in an LS sample. A P test is conducted over the region between El and Eu of the integrated Compton spectrum for linearity. El to Eu is linear if a sample consists of one phase. It is non-linear if a sample consists of more than one phase.

An exception may occur if the P test indicates one phase. Accordingly, a secondary test is performed to confirm a single phase conclusion from the P test. Should the energy difference between two Compton edges be large and the intensity of one phase be small, then the P test can miss the second edge indicated by Ef to Em in FIGS. 4 and 5.

Operation of the exemplary procedures has proven to be successful for pyrex and plastic vials; Beckman (trademark) cocktails designed for Liquid Scintillation counters; sample volumes for the range 0.5–20 ml. and least phase volume: 0.1 to 10 ml where both phases scintillate; and a quench range corresponding to $0 <= H\# <= 350$.

Figure 6:
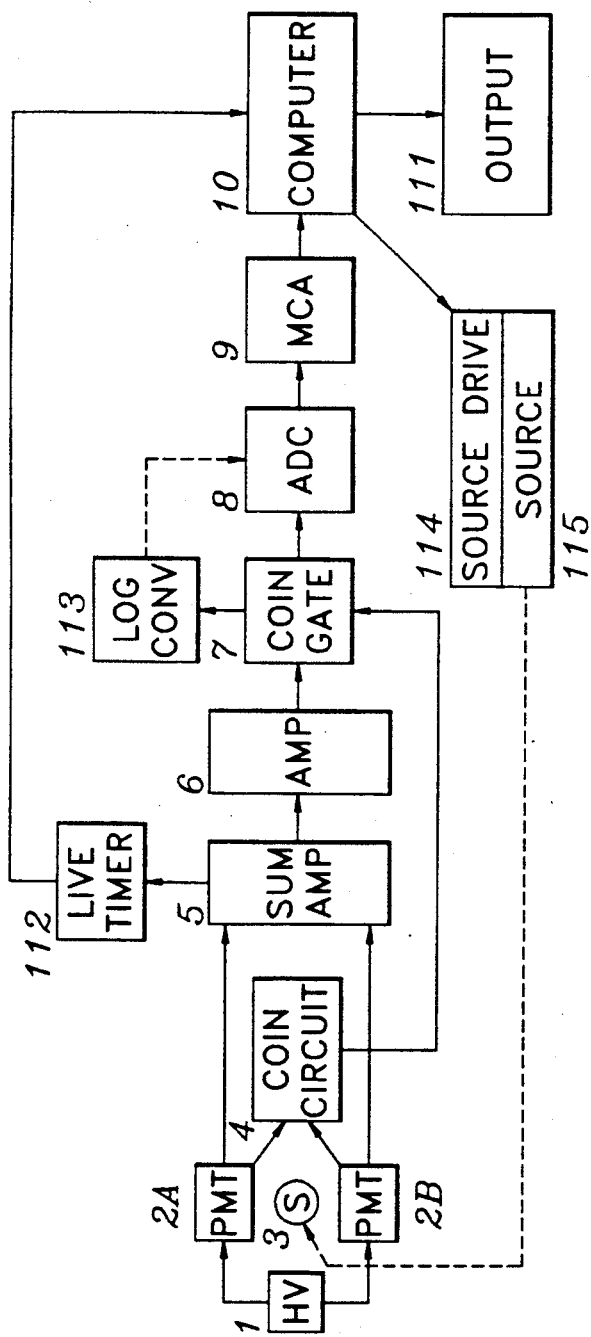
FIG. 6 is a block diagram of a liquid scintillation counter which contains means to provide Compton spectra of presented samples, means to integrate the Compton spectra and means to determine the phase content of the samples.

FIG. 6 is a block diagram of a liquid scintillation counter. The LS counter provides a Compton spectrum of a presented sample. The LS counter includes means to determine the Compton spectrum and integrate the Compton spectrum over its entire data range. Means to test whether the data from a sample is linear in the specified ranges. This is effectively done in a computer 10 associated with the LS counter. A computer 10 analyzes the spectral results contained in the MCA 9 and outputs the information. The computer also controls other circuitry, motors, all interaction with the user and provides all needed calculations.

Block 1 is a high voltage control for photomultiplier tubes 2A and 2B located at opposite sides of the sample counting chamber 3. The two photomultiplier tubes 2A and 2B detect photons in coincidence. There are photons generated by the same beta event but moving in opposite directions and detected by one of the photomultiplier tubes 2A or 2B within X nanoseconds of detection by the first photomultiplier tube 2A or 2B. The tube outputs are directed to a coincidence gate 7 which electronically passes the signal through an analog-to-digital converter 8 to a multichannel analyzer 9, should the pulses be in coincidence. Should the two pulses be determined to be out of coincidence, then the coincidence gate 7 is closed so that the multichannel analyzer 9 does not receive the pulse.

The outputs from the photomultiplier tubes 2A and 2B are also directed to a summation amplifier 5 which adds the two pulses and thereby increases the sensitivity of detection. The signal would otherwise be halved on average as if only one tube were present. The summed signal is amplified further by amplifier 6 and then is passed or not passed by the coincidence gate 7 as previously described.

The analog signal from the coincidence gate 7 passes to the analog-to-digital converter 8 before being fed to the multichannel analyzer (MCA) 9. The MCA 9 determines the relative intensity of the pulse and sorts a count in the appropriate channel. The computer 10 also controls other circuitry, motors, all interaction with the user and provides all needed calculations. The computer 10 provides an output 111. The summation amplifier 5 operates a timer 112 which interacts with the computer 10. A log converter circuit 113 is connected between the coincidence gate 7 and converter 8.

Computer control activates the source drive on demand. The source drive 114 moves the Cs-137 source 115 adjacent the sample so that gamma irradiation may take place to produce the Compton spectrum discussed previously with regard to FIG. 1. The computer combined with memory provides the means to locate any preselected point on the pure Compton spectrum, such as the energy corresponding to 0.995 of the total counts, $E_l$, $E_u$ or $H\#$.

The computer 10 determines the linearity of a predetermined part of the integrated Compton spectrum as indicated with reference to FIGS. 3, 4, and 5. Should linearity be determined in the first region of the integrated Compton spectrum then the additional region is also tested for linearity so as to confirm the phase content of the sample.

The invention has been described with reference to the accompanying data, which relate to the linear content spectra and integrated Compton spectra and are exemplary.

Many other examples of the invention exist, each differing from the other in matters of detail only. For instance, instead of a set of integrated spectra, it may be possible to do the same determination of phase with a set of the Compton spectra in a different geometric space. Indeed, the linear Compton spectra itself could be analyzed over the equivalent portion for determination of single- or multi-phase samples. Different external standard nuclides can be used. The invention is not to be limited by the above examples but solely by the appended claims.

I claim:

1. Apparatus for determining the phase content of a liquid scintillation sample comprising means for transforming at least a substantial portion of a Compton spectrum of data into a different geometric space, means for establishing a predetermined parameter in the selected geometric space, the predetermined parameter being indicative of the phase content of the sample, and means for comparing the data in the different geometric space to the predetermined parameter thereby to provide a determination of the phase content of the sample.

2. Apparatus as claimed in claim 1 wherein the means for transforming the data into a different geometric space transforms the data into integrated Compton data.

3. Apparatus as claimed in claim 2 wherein the predetermined parameter is the degree of linearity in the integrated space.

4. Apparatus as claimed in claim 3 wherein the Compton spectrum is integrated at least between an end point to about the 80% point of the total energy spectrum.

5. Apparatus as claimed in claim 4 wherein the integration is at least between about the 10% end point of the energy spectrum and about the 90% point of the energy spectrum.

6. Apparatus as claimed in claim 5 wherein the integration is over at least from about the 5% end point of the energy spectrum to about the 99% point of the energy spectrum.

7. Apparatus as claimed in claim 6 wherein the integration is over at least from about the 10% end point of the energy spectrum to the about 99.5% point of the energy spectrum.

8. Apparatus as claimed in claim 3 wherein linearity is determined between two points of the energy spectrum as determined by the quench level of the sample.

9. Apparatus as claimed in claim 8 wherein linearity between two predetermined points is indicative of a single phase sample, and including means for confirming the single phase condition by testing at least one second range on the spectrum.

10. Apparatus as claimed in claim 9 wherein this further confirmatory test is conducted between about at least two further ranges of the energy spectrum, including means to test for the linearity between these further energy ranges.

11. Apparatus as claimed in claim 9 where linearity in about the 90% to about the 99.5% range of the energy spectrum is indicative of a multi-phase sample.

12. Apparatus as claimed in any one of claims 1 to 11 including means for receiving a sample for liquid scintillation counting, means for counting signals from the liquid scintillation counter, and means for relating those counts into a procedure for determining the phase content of the sample.

13. Apparatus as claimed in claim 10 wherein the linearity determination is between about the 7% point and about the 55% point of the energy spectrum.

14. Apparatus as claimed in claim 8 wherein the linearity determination is between about the 7% point and about the 55% point of the energy spectrum.

15. Apparatus as claimed in claim 1 wherein the predetermined parameter is the degree of linearity.

16. Apparatus as claimed in claim 15 wherein linearity is determined between two points of the energy spectrum as determined by the quench level of the sample.

17. Apparatus as claimed in claim 16 wherein linearity between two predetermined points is indicative of a single phase sample, and including means for confirming the single phase condition by testing at least one second range on the spectrum.

18. A method for determining the phase content of a liquid scintillation sample comprising transforming at least a substantial portion of a Compton spectrum of data into a different geometric space, establishing a predetermined parameter in the selected geometric space, the predetermined parameter being indicative of the phase content of the sample, and comparing the data in the different geometric space to the predetermined parameter thereby to provide a determination of the phase content of the sample.

19. A method as claimed in claim 18 wherein transforming the data into a different geometric space transforms the data into integrated Compton data.

20. A method as claimed in claim 19 wherein the predetermined parameter is the degree of linearity in the integrated space.

21. A method as claimed in claim 20 wherein the Compton spectrum is integrated at least between about an end point to about the 80% point of the total energy spectrum.

22. A method as claimed in claim 21 wherein the integration is at least between about the 10% end point of the energy spectrum and about the 90% point of the energy spectrum.

23. A method as claimed in claim 22 wherein the integration is over at least from about the 10% end point of the energy spectrum to the 99.5% point of the energy spectrum.

24. A method as claimed in claim 23 wherein linearity between two predetermined points is indicative of a single phase sample, and including means for confirming the single phase condition by testing at least one second range on the spectrum.

25. A method as claimed in claim 24 wherein linearity in about the 90% to about the 99.5% range of the energy spectrum is indicative of a multi-phase sample.

26. A method as claimed in claim 14 wherein the two predetermined points are about the 7% point and the 55% point of the energy spectrum.

27. A method as claimed in claim 26 wherein the confirmation test is effected at about the 90% to the about 99.5% of the energy spectrum.

28. A method as claimed in claim 18 wherein the predetermined parameter is the degree of linearity.

29. A method as claimed in claim 28 wherein linearity between two predetermined points is indicative of a single phase sample, and including means for confirming the single phase condition by testing at least one second range on the spectrum.

* * * * *